United States Patent Office 3,334,056
Patented Aug. 1, 1967

3,334,056
POLYURETHANES FROM PHOSPHORUS
CONTAINING ISOCYANATES
Peter Fischer, Cologne-Flittard, Hans Holtschmidt, Cologne-Stammheim, and Gunther Oertel and Gunther Braun, Cologne-Flittard, Germany, assignors to Farbenfabriken Bayer Aktiengesellschaft, Leverkusen, Germany, a corporation of Germany
No Drawing. Original application May 21, 1962, Ser. No. 196,483, now Patent No. 3,277,212, dated Oct. 4, 1966. Divided and this application Feb. 11, 1966, Ser. No. 541,049
Claims priority, application Germany, May 25, 1961, F 34,008, Patent 1,149,529
12 Claims. (Cl. 260—2.5)

This is a division of Ser. No. 196,483, filed May 21, 1962, now U.S. Patent 3,277,212.

This invention relates to new compositions of matter and their method of manufacture. More specifically, the inventive concept herein resides in novel phosphorous containing isocyanates having unique and unexpected properties.

The composition of this invention has been found to have desirable properties in the manufacture of flame retardant plastics. These compositions may be illustrated as having the following general formula:

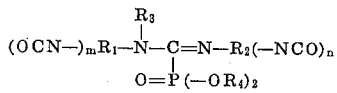

wherein $m$ and $n$ are integers having a value of up to 3, $R_1$ and $R_2$ are radicals selected from the group consisting of aliphatic, cycloaliphatic, araliphatic, aromatic, heterocyclic groups and mixtures thereof; $R_3$ is an acyl radical and $R_4$ is a radical selected from the group consisting of substituted and unsubstituted alkyl groups. In the preferred embodiment of this invention, $m$ and $n$ have values of from one to 3 and $R_3$ is the radical

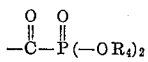

$R_1$ and $R_2$ also may comprise other substituents such as, halogen, alkoxy, nitro and sulphone groups or mixtures thereof.

It is, therefore, an object of this invention to provide novel phosphorous containing isocyanates. It is another object of this invention to provide a method for making these new compositions of matter. A still further object of this invention is to provide phosphorous containing polyisocyanates which may be used in the production of highly flame resistant polyurethane plastics.

The foregoing objects and others which will become apparent from the following description are accomplished in accordance with this invention, generally speaking, by providing novel polyisocyanates made by reacting polyisocyanates with carbodiimides; the reaction mixture produced thereby is then contacted with a chlorine carbon composition to produce a resulting chlorinated formamidine. This formamidine is then reacted with a trialkyl phosphite to produce the compositions disclosed herein.

The compositions of this invention subsequently may be reacted with any suitable organic compound containing active hydrogen atoms which are reactive with NCO groups to form the desired flame retardant plastic.

Generally, the new compositions herein defined may be made by reacting an isocyanate with a carbodiimide. The reaction mixture obtained thereby is then contacted with a halogenated carbon containing composition to form a formamidine. This resulting formamidine is then reacted with a trialkyl phosphite to produce the compositions of this invention. Any suitable isocyanate may be used to produce the compositions herein defined, provided they contain more than one NCO group, such as, for example, toluylene 2,4-diisocyanate, toluylene 2,6-diisocyanate, 4,4'-diisocyanato diphenyl methane, 1,5-naphthalene-diisocyanate, m-phenylene diisocyanate, p-phenylene diisocyanate, 4,4',4''-triisocyanato triphenyl methane, 2,4-bis(4-isocyanato benzyl) phenyl isocyanate, phosphoric acid (4-isocyanato phenyl) triester, cyclohexane 1,4-diisocyanate, hexane 1,6-diisocyanate. Aliphatic, aromatic, alicyclic and heterocyclic polyisocyanates would also be considered as suitable organic polyisocyanates which may be used to manufacture the new compositions of this invention.

Additional examples of isocyanates included as those having utility in the presently defined process include ethylene diisocyanate,
ethylidene diisocyanate,
propylene diisocyanate,
butylene diisocyanate,
cyclopentylene-1,3-diisocyanate,
cyclohexylene-1,4-diisocyanate,
cyclohexylene-1,2-diisocyanate,
2,2'-diphenyl propane-4,4'-diisocyanate,
3,3'-dimethyl diphenyl methane-4,4'-diisocyanate,
p-phenylene diisocyanate,
m-phenylene diisocyanate,
xylylene diisocyanate,
1,4-naphthylene diisocyanate,
diphenyl-4,4'-diisocyanate,
azobenzene-4,4'-diisocyanate,
diphenyl sulphone-4,4'-diisocyanate,
dichlorohexamethylene diisocyanate,
tetramethylene diisocyanate,
pentamethylene diisocyanate,
hexamethylene diisocyanate,
1-chlorobenzene-2,4-diisocyanate,
furfurylidene diisocyanate,
2,7-diisocyanato-dibenzofuran,
1,3,5-benzene-triisocyanate,
2,4,6-tolylene triisocyanate,
triphenyl methane triisocyanate,
tetraphenyl methane tetraisocyanate
and the like.

It is preferred, however, that diisocyanates and particularly aromatic diisocyanates be used. Best results are obtained using diphenyl alkane diisocyanate and even more preferably, 4,4'-diphenyl methane diisocyanate.

Any suitable carbodiimide may be used in the process of this invention, for example, monocarbodiimides, carbodiimides, uretoneimines, substituted halogenoformamidines, such as dimethylcarbodiimide, diethylcarbodiimide, diisopropylcarbodiimide, di-n-butylcarbodiimide, dicyclohexylcarbodiimide, dibenzylcarbodiimide, diphenylcarbodiimide, bis-p-tolylcarbodiimide, bis - (2,6 - diisopropylphenyl) - carbodiimide, α-naphthylcyclohexylcarbodiimide; it is preferred to employ carbodiimides being obtained by prolonged heating of one of the above polyisocyanates to temperatures of above 160° C. or obtained by heating in the presence of e.g. diphenyl phosphin oxide, tributylphosphinoxide or other carbodiimide forming catalysts.

Examples of halogen carbon containing compounds which may be used to react with the reaction mixture of the polyisocyanate and the carbodiimides are phosgene, carbonic acid dibromide, thiophosgene, cyanogen chloride, methyl chloroformate, acetyl chloride and other carboxylic acid chlorides, further phosphorus trichloride, phosphorus tribromide, sulfurylchloride, nitrosylchloride.

Suitable trialkyl phosphites which may be reacted with the resulting halogenoformamidines are trimethyl phosphite, trichloroethyl phosphite, tribromethyl phosphite, tributyl phosphite, trichloropropylphosphite, tris-(dichloropropyl)-phosphite.

In using the new compositions of matter defined herein in the manufacture of plastics having desirable flame retardant properties, the new compositions of this invention may be reacted with a composition having at least two active hydrogen containing atoms as determinable by the Zerewitinoff test. It is preferred in this process that the active hydrogen containing compounds have a molecular weight of at least about 400, however, best results were obtained with compositions having a molecular weight of at least about 600. Typical of these compositions containing active hydrogen atoms are, for example, polyhydric alcohols, hydroxyl polyesters, polyhydric polyalkylene ethers, polyhydric thioethers, polyester amides and polyacetals.

It has been known from the prior art to produce cross-linked plastics of high molecular weight from polyisocyanates and linear or branched condensation or polymerization products which contain hydroxyl groups and have a molecular weight of at least about 800. It is also known to use compounds which comprise at least two hydrogen atoms reactive with isocyanates and have a molecular weight below about 500. The resulting plastics, however, which are produced in this manner are easily ignited, and for this reason leave much to be desired. It is also known that the flame resistance of polyurethane plastics can be increased by mixing therewith known reactive phosphoric acid esters of low molecular weight, such as trichloroethyl phosphites. There are, however, inherent disadvantages to these resulting plastics, since it is only possible to add limited quantities of these compounds of low molecular weight which result in products having inadequate flame protection. Also the added components because of their low molecular weight, evidence a tendency to migrate from the polyurethane plastic. There have been several attempts to overcome these above noted disadvantages, however, none of these have been satisfactory and have left much to be desired. For example, halogenated polycarboxylic acids or polyols have been incorporated into the molecular structure. These polyesters built up with such components have evidenced some improved flame resistance, but have not been found to be adequate in many cases. Such a polyester because of their high viscosity can only be mixed with great degree of care and difficulty with the polyisocyanate at room temperature, furthermore, these polyesters when mixed with polyisocyanates generally produce brittle foam materials, so that only after they have been mixed with the conventional polyesters can they be transformed into foam materials having desirable mechanical properties. The result is then that the improved flame retardant of the original foam is lost or at least greatly diminished. Flame resistant polyurethane plastics having desirable mechanical properties have also been obtained from the use of polyisocyanates containing phosphoric or fine phosphoric acid groups, such as, phosphoric acid triesters. The phosphoric ester triisocyanates which are used, however, are only available after processes involving several stages and their use therefor has been found to be commercially untendable.

It has been found that plastics having very desirable flame retardant properties may be obtained in a very convenient manner by using the novel polyisocyanates of this invention. These polyisocyanates may simply be reacted with condensation and/or polymerization products which contain hydroxyl and/or carboxyl groups and have a molecular weight of at least about 600; included in these compounds would be polyester amides, polyacetals and the like.

Any suitable organic compound containing active hydrogen atoms which are reactive with NCO groups may be used in the fabrication of suitable polyurethane plastics such as, for example, hydroxyl polyesters, polyester amides, polyhydric polyalkylene ethers, polyhydric polythioethers, polyacetals and the like. Any suitable hydroxyl polyester may be used, such as, for example, the reaction product of a polycarboxylic acid and a polyhydric alcohol. Suitable polyhydric alcohols are, for example, ethylene glycol, propylene glycol, butylene glycol, 1,4-butanediol, butenediol, butynediol, xylylene glycol, amylene glycol, 1,4 - phenylene - bis - (β-hydroxy ethyl ether), 1,3-phenylene - bis - (β-hydroxy ethyl ether), bis - (hydroxy methyl-cyclohexane), hexanediol, thiodiglycol, trimethylolethane, trimethylolpropane, glycerine, pentaerythritol and the like; polyamines such as, for example, ethylene diamine, propylene diamine, butylene diamine, hexamethylene diamine, cyclohexylene diamine, phenylene diamine, tolylene diamine, xylylene diamine, 3,3′ - dichlorobenzidene, 3,3′ - dinitrobenzidene, 4,4′ - methylene-bis - (2-chloroaniline), 3,3 - dichloro - 4,4′ - biphenyl diamine, 2,6-diamino pyridine, 4,4′ - diamino diphenyl methane and the like; alkanol amines such as, for example, ethanol amine, aminopropyl alcohol, 2-2-dimethyl propanol amine, 3-amino cyclohexyl alcohol, p-amino benzyl alcohol and the like. Any suitable polycarboxylic acid may be used in the preparation of the polyesters such as, for example, adipic acid, succinic acid, suberic acid, sebacic acid, oxalic acid, methyl adipic acid, glutaric acid, pimelic acid, azelaic acid, phthalic acid, terephthalic acid, isophthalic acid, thiodiglycollic acid, thiodipropionic acid, maleic acid, fumaric acid, citraconic acid, itaconic acid, benzene tricarboxylic acid, and the like. Of course, the corresponding acid anhydrides may also be used. Any suitable polyhydric alcohol may be used in the preparation of the polyesters such as, for example, ethylene glycol, propylene glycol, butylene glycol, hexanediol, bis-(hydroxymethyl cyclohexane), 1,4-butanediol, diethylene glycol, polyethylene glycol, 2,2-dimethyl propylene glycol, xylylene glycol, trimethylol ethane, trimethylol propane, glycerine, pentaerythritol, sorbitol and the like. It is generally preferred that the polyurethane elastomeric plastics have a substantially linear configuration and, therefore, the difunctional acids and alcohols are preferred.

Any suitable polyhydric polyalkylene ether may be used such as, for example, the condensation product of an alkylene oxide with a small amount of a compound containing active hydrogen containing groups such as, for example, water, ethylene glycol, propylene glycol, butylene glycol, amylene glycol and the like. Any suitable alkylene oxide condensate may also be used such as, for example, condensates of ethylene oxide, propylene oxide, butylene oxide, amylene oxide, styrene oxide and mixtures thereof. The polyalkylene ethers prepared from tetrahydrofuran may also be used. The polyhydric polyalkylene ethers may be prepared by any known process such as, for example, the process described by Wurtz in 1859 and in the "Encyclopedia of Chemical Technology," volume 7, pages 257 to 262, published by Interscience Publishers in 1951 or in U.S. Patent 1,922,456.

Any suitable polyhydric polythioether may be used such as, for example, the reaction product of one of the aforementioned alkylene oxides used in the preparation of the polyhydride polyalkylene ether with a polyhydric thioether such as, for example, thiodiglycol, 3,3-dihydroxy propyl sulphide, 4,4-dihydroxy butyl sulphide, 1,4-(β-hydroxyl ethyl) phenylene dithioether and the like.

Any suitable polyester amide may be used such as, for example, the reaction product of an amine and/or amino alcohol with a carboxylic acid. Any suitable amine such as, for example, ethylene diamine, propylene diamine and the like may be used. Any suitable amino alcohol such as, for example, β-hydroxy ethyl amine and the like may be used. Any suitable polycarboxylic acid may be used such as, for example, those more particularly described above for the preparation of the hydroxyl polyesters. Further, a mixture of a glycol and an amino alcohol or polyamine may be used. Any of the glycols mentioned for the preparation of the polyesters may be used.

Any suitable polyacetal may be used such as, for example, the reaction product of an aldehyde and a polyhydric alcohol. Any suitable aldehyde may be used such as, for example, formaldehyde, paraldehyde, butyraldehyde and the like. Any of the polyhydric alcohols mentioned above in the preparation of the hydroxyl polyesters may be used.

Typical examples of compounds included within the scope of this invention are as follows:

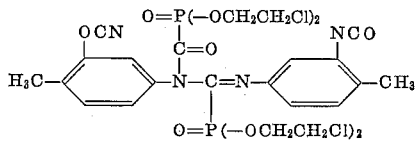

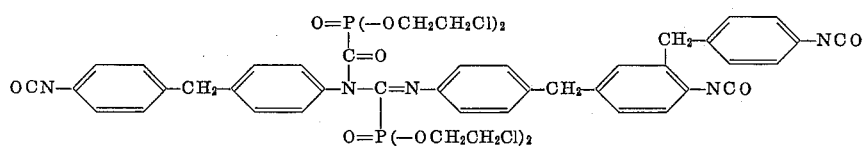

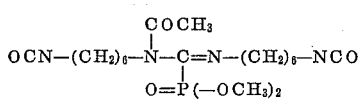

In the production of these phosphorylated polyisocyanates, there are expediently used initially an isocyanate which is at least divalent, some of the isocyanate groups present will be converted into carbodiimide groups.

In the preparation of the phosphorous isocyanates of this invention, secondary products, for example, polymers of carbodiimides which do not come within the general formula above indicated may occur in each reaction stage. These secondary products will not disturb or be detrimental in the processing of the phosphorous isocyanates to the flame resistant polyurethane plastic. The presence of such secondary products in the phosphorous isocyanates may be even advantageous, for example, when the secondary products are capable of dissolving polyisocyanate solidifying in crystalline form at room temperature, for example, 4,4'-diisocyanatodiphenyl methane.

The effect of lowering the melting point of isocyanate mixtures which contain phosphorous and which have been obtained by the method indicated above can also be achieved by admixture with phosphorous-free polyisocyanates. To be considered as the latter are aliphatic and aromatic polyvalent isocyanates, for example, alkylene diisocyanates such as, tetra- and hexa-methylene diisocyanates, arylene diisocyanates and their alkylation products, such as, toluylene diisocyanates, diphenylmethane diisocyanate, di- and tri-isopropyl benzene diisocyanate and triphenylmethane triisocyanate, aralkyl diisocyanates, such as 1-(isocyanatophenyl)-ethyl isocyanate or the xylylene diisocyanates, as well as the polyisocyanates of the above type substituted by various substituents such as, OR, $SO_2R$, $NO_2$, Cl; in addition, the reaction products of the above isocyanates with less than equivalent quantities of polyhydroxy compounds, such as, trimethylol propane, hexanetriol glycerine, butanediol and also polyisocyanates concealed by phenols and polymerized isocyanates with isocyanurate or uretdione rings.

Depending on the choice of the starting materials and reaction conditions, it is possible by the process of the invention to obtain high-grade, elastomeric materials, hard and elastic foam materials or also lacquers, films, foils, molding compositions, adhesives, textile coatings and the like.

For example, high-grade elastomeric materials are obtained if linear condensation and/or polymerization products containing predominantly hydroxyl groups and having a molecular weight higher than 800 are reacted with a phosphorous-containing predominantly bifunctional polyisocyanate of the said type in a quantity greater than that which corresponds to the stoichiometric ratio of hydrogen atoms capable of reacting with isocyanates, to form reactive isocyanate groups, and the reaction product is reacted with glycols, diamines or water. In this way, an additional cross-linking is effected and a shaping can take place immediately or at a later stage.

If the linear or branched condensation and/or polymerization products containing hydroxyl groups and having a molecular weight higher than 800 are reacted with phosphorus-containing polyisocyanates of the type characterized and in such proportions that there is more than one isocyanate group to each hydrogen atom capable of reacting with an isocyanate group, and if the reaction takes place in the presence of a blowing agent, more especially water, foam materials are obtained. The foaming is preferably carried out in the presence of reaction accelerators, such as triethylene diamine, dimethyl benzylamine, molybdenum glycolate, tin-II-octoate or dialkyl-tin-IV-compounds. Foam stabilizers and emulsifiers such as polysiloxane polyalkylene glycol esters, basic silicone oils or paraffin oil will also be concurrently used, and it is also possible to use azo compounds and/or low-boiling alkanes or halogeno-alkanes, for example, trichlorofluoromethane, as blowing agents. By this method, there are obtained incombustible foam materials and more especially hard foam materials which have good mechaniacl properties.

According to another form of the invention, the predominantly linear condensation and/or polymerization products which contain hydroxyl groups and have a molecular weight higher than 800 can also be reacted with an excess of a phosphorous containing polyisocyanate of the type mentioned and the resulting reaction product containing NCO groups can be reacted with an excess of diamine or glycols. The product which is obtained and which has free amino or hydroxyl groups is then reacted with a further quantity of a diisocyanate containing phosphorous. It is, of course, also possible to use the reverse procedure, that is to say, to use any desired diisocyanate in the first stage and polyisocyanate containing phosphorous in the second stage.

According to another working procedure, condensation and/or polymerization products containing hydroxyl groups are first of all reacted with phosphorus containing diisocyanates in a quantity less than that calculated on the hydroxyl groups present and the storable products are cross-linked at a later stage, either with phosphorus containing polyisocyanates, phosphorus free polyisocyanates or also with peroxides, sulphur or formaldehyde in a manner known per se.

Noncombustible films, lacquers, coatings and surfacing materials are formed, for example, if branched phosphorus containing condensation and/or polymerization products of the type described above, which products still contain free hydroxyl groups and have a molecular weight higher than 800, are applied to a support together with polyisocyanates or phosphorus containing polyisocyanates or the concealed polyisocyanates derived therefrom, and if necessary cross-linking agents and solvents, reaction being allowed to take place in the cold or by heating if required after evaporating the solvent.

Finally, flame resistant molding compositions can be obtained if a mixture of condensation and/or polymerization products which contain hydroxyl groups and which if desired can be modified beforehand with phosphorous containing polyisocyanates in the manner described, relatively large quantities of fillers, for example, sawdust, chalk, soot or colloidal silica, and polyisocyanates and/or phosphorous containing polyisocyanates of the type more fully characterized, is pressed under heat while shaping.

The invention will be further illustrated by the following example in which parts are by weight unless otherwise specified. It should be noted, however, that these examples are merely given to illustrate and not limit the invention of the particulars disclosed therein.

*Example 1.—Preparation of phosphorous containing polyisocyanates*

A polyisocyanate is obtained from a mixture of polyamines by reaction with phosgene in chlorobenzene solution. The initial mixture of polyisocyanate is prepared from an undistilled mixture of diphenyl methane bases, such as those formed in the hydrochloric acid condensation of aniline with formaldehyde. This mixture of polyisocyanate has 29.2% of NCO, and a viscosity of 150° cp./25° C. About 1400 parts of this polyisocyanate mixture was added to 70 parts of dicyclohexyl carbodiimide, heated under vacuum of 60 mm. Hg to 140 to 150° C. About 75 parts of cyclohexyl isocyanate was distilled off, and 44 parts of phosgene were introduced at 120° C. into the resulting carbodiimide polyisocyanate mixture, which still contains 26.6% of NCO. About 195 parts of industrial trichloroethyl phosphite were added dropwise at 30 to 40° C. to 1000 parts of phosgene. When the reaction is no longer exothermic, the mixture was heated for two hours at 80 to 100° C. and towards the end of this time, a vacuum of 10 mm. Hg is applied in order to remove any dichloro ethane which is split off. The new phosphorous-containing polyisocyanate resulting therefrom contained 23.7% of NCO and 2.3% of phosphorous.

Using the above phosphorous containing polyisocyanate, it was possible to obtain a highly flame resistant foam in the following manner.

About 100 parts of a polyester prepared from adipic acid, phthalic acid, oleic acid and trimethylol propane and having 11.5% OH are thoroughly mixed with 2 parts of permethylated aminoethyl piperazine, 0.3 part of polysiloxane polyalkylene glycol ester and 6 parts of sodium-castor oil sulphate (50% water). This mixture is foamed with addition of 156 parts of an isocyanate mixture of 78 parts of polyisocyanate of the diphenyl methane series with 29.2% of NCO and a viscosity of 150 cp./25° C., prepared as indicated above and 78 parts of the phosphorous containing polyisocyanate.

A fine-pored highly flame resistant hard foam is obtained which has the following physical properties:

Weight per unit volume_____kg./m.$^3$__ 53
Compressive strength_____kg./cm.$^2$__ 3.6
Impact toughness_____kg./cm__ 0.3
Water absorption_____percent__ 1.7
Hot bending strength_____° C__ 152

*Example 2*

Preparation of a further embodiment of a composition of this invention:

About 3000 parts of pure 4,4'-diisocyanato diphenyl methane and 236 parts of diphenyl carbodiimide were heated in a slowly improved vacuum, and within three hours it varied from 120° C./100 mm. Hg to 185° C./2 mm. Hg About 280 parts of phenyl isocyanate contaminated with a little 4,4'-diisocyanato diphenyl methane was distilled off. The polyisocyanate mixture which contains carbodiimides and which is cooled within 10 minutes to 40° C. This polyisocyanate mixture was found to contain 30.4 % NCO. By treating with 81 parts of phosgene, at 120° C. there was obtained a mixture of different isocyanates some of which containing chloroformyl chloroformamidines. This product was treated at a temperature of 80° C. with 560 parts of trichloroethyl phosphite, the chloroformyl chloroformamidines entering into the reaction. In addition, a small amount of $CO_2$ was split off. By heating the reaction product under a vacuum of 50 mm. Hg to 150° C., 105 parts of ethylene chloride are removed. The red oil cooled at room temperature and filtered off from 350 parts of the deposit was found to have a viscosity of 103 cp./25° C. and contain 25.3% of NCO and 1.7% phosphorous.

A further material was obtained by the following procedure:

About 80 parts of a polyester described in Example 1 and having 11.5% OH were thoroughly mixed with 20 parts of a propoxylated ethylene diamine (22% OH), about 3 parts of a permethylated aminoethyl piperazine, about 0.5 part of polysiloxane polyalkylene glycol ester and about 30 parts of trichlorofluoromethane. By the addition of 136 parts of the phosphorylated polyisocyanate, there is formed a non-brittle flame resistant hard foam, when said mixture was introduced into the molds. This foam had the following mechanical values:

Weight per unit volume_____kg./m.$^3$__ 34
Compressive strength_____kg./cm.$^2$__ 1.6
Impact toughness_____kg./cm__ 0.6
Hot bending strength_____° C__ 114
Water absorption_____percent__ 1.4

The invention above described relates to the above disclosed, and the above examples have been given for the purpose of illustration. It should be understood that those skilled in the art upon a reading of this basic invention will consider other ramifications and deviations that can be made in regard to the present invention. These are considered to be included within the scope and preview of this invention.

*Example 3*

Preparation of phosphorus containing polyisocyanate:
2000 parts of 4,4'-diisocyanato diphenyl methane and 350 parts of diphenylcarbodiimide are heated under vacuum of 40 to 50 mm. Hg to 150 to 165° C. 385 parts of phenyl isocyanate are distilled off within 1½ hours. Then further 40 parts of distillate are obtained at 165 to 180° C. at 5 to 2 mm. Hg which removes the last traces of monoisocyanate. The resulting carbodiimide-isocyanate mixture is then cooled within 30 minutes to 50° C. and then 140 parts of phosgene are introduced at this temperature while cooling. 1000 parts of industrial trichloroethyl phosphite are added dropwise while the temperature rises to 80° C.

When the reaction is no longer exothermic the mixture is heated for ½ hour at 90 to 100° C. while stirring and then treated at 90 mm. Hg in a film evaporator at a heating temperature of 120° C. 130 parts of ethylene chloride are distilled off. The new phosphorus containing polyisocyanate resulting therefrom is a reddish oil and contains 17.6 percent NCO, 3.8 percent phosphorus and 14.0 percent chlorine. Its viscosity is 260 cp./25° C.

This new phosphorus containing polyisocyanate composition is made into a joint sealing mass as follows:

100 parts of an anhydrous polyester prepared from adipic acid, diethylene glycol and trimethylol propane are mixed with 0.1 part of N-methyl-N',N'-dimethyl-aminoethyl piperazine as catalyst. Then 13 parts of the above phosphorilated polyisocyanate are introduced at room temperature. The viscous but castable mass is then poured as sealing material. Its pot life is 30 minutes.

If the solidified elastic mass is touched with the flame of a Bunsen burner it starts to melt and then begins to burn. The flame, however, is extinguishing after 2 to 3 seconds after the removal of the burner.

A test with the corresponding materials prepared from 4,4'-diphenylmethane diisocyanate continues its burning to 35 to 40 seconds.

Example 4

The phosphorilated polyisocyanate prepared in accordance with Example 3 yields a highly inflammable lacquer film as follows:

100 parts of a hydroxyl group containing polyester prepared from adipic acid and ethylene glycol (8.8 percent OH) are dissolved in a mixture of equal parts of ethyl acetate, butyl acetate, ethyl glycol acetate and toluene. 116 parts of the phosphorilated polyisocyanate are then added to the mixture which is then prereacted for 15 minutes and then made into a lacquer film by brushing, spraying or casting. The pot life of the mixture is 40 hours. The physical properties of the lacquer film are:

Drying time _____ minutes__ 85
Pendulum hardness (Albert König) (200μ):
   After 2 days _____ seconds__ 66
   After 12 days _____ do____ 103
Hardness degree according to Erichsen _____ mm__ 7.7
Resistance against solvents: xylol, toluene, ethyl acetate, butyl acetate, good; acetone, ethanol, swelling.

Example 5

This example shows the preparation of a solvent-free lacquer:

700 parts of castor oil and 300 parts of blown castor oil are mixed with 560 parts of ferric oxide, 275 parts of barium sulphate, 60 parts of sodium alumo silicate and 100 parts of talcum. To this mixture 820 parts of the phosphorilated polyisocyanate of Example 3 are added. The pot life is 60 minutes. The lacquer solidifies with a thickness as desired without any trouble.

Drying time _____ minutes__ 130
Pendulum hardness (Albert König) (200μ):
   After 2 days _____ seconds__ 58
Hardness degree according to Erichsen _____ mm__ 6.8
Resistance against solvents: xylol, toluene, butyl acetate, good; ethyl acetate, methylisobutyl ketone, some swelling; acetone, swelling.

Example 6

Preparation of phosphorus containing polyisocyanate.

2900 parts of hexamethylenediisocyanate and 750 parts of dicyclohexyl carbodiimide are mixed and heated to 100° C. at 40 mm. Hg. The temperature is increased within 90 minutes to 130° C. at 2 mm. Hg while 1930 parts of a mixture of cyclohexyl isocyanate and hexamethylene diisocyanate are distilled off. The residue is cooled to 50° C. and has introduced therein 350 parts of phosgene by cooling. 2080 parts of industrial trichloroethyl phosphite are added dropwise and the mixture is heated for ½ hour to 90 to 100° C. The product is degassed in a film evaporator at a heating temperature of 130° C. in vacuo of 70 mm. Hg. 500 parts of ethylene chloride are distilled off. The new phosphorilated polyisocyanate is a yellow oil containing 15.2 percent NCO, 6.4 percent phosphorus and 19.2 percent chlorine. Its viscosity is 370 cp./25° C. The textile lamination is made therefrom as follows:

30 parts of a toluylene diisocyanate modified polyester prepared from adipic acid and ethylene glycol (dissolved in 70 parts of ethyl acetate) are mixed with 5 parts of the above phosphorilated polyisocyanate and with 5 parts of a 7 percent ethyl acetate solution of a diurethane prepared from 1 mol of N-methylidethanol amine and 2 mols of phenyl isocyanate. This solution is applied several times to a cotton fabric (m.² weight 110 g.), while each layer is dried at 80° C. In this manner 80 g./m.² of material are applied to the fabric.

After 5 days' storage the lamination is insoluble in organic solvents.

In comparison to a lamination made with a phosphorus-free isocyanate from toluylene diisocyanate and hexantriol as usual the new material shows a strong decrease of inflammability and a complete suppression of smoldering after the flame has been removed.

Example 7

30 parts of formaldehyde as a 37 percent aqueous solution are dropped at 40 to 50° C. to 110 parts of diethanol amine. The mixture is combined with 207 parts of dichloroethyl phosphite at 40° C. When the reaction is no longer exothermic the volatile parts of the mixture, especially the water, are distilled off under vacuum at a bath temperature of 60° C. The residue consists of 323 parts of phosphorilated hydroxyl compound as a colorless oil (OH number 344).

30 parts of the isocyanate modified polyester of Example 6 dissolved in ethyl acetate are mixed with 7 parts of the above described phosphorus containing hydroxyl compound, 19 parts of the phosphorilated polyisocyanate of Example 6 and 5 parts of the 7 percent catalyst solution of Example 6. The mixture is applied to a cotton fabric. The inflammability of the material is still more decreased compared with the lamination of Example 6.

What is claimed is:

1. A flame resistant polyurethane plastic composition obtained from the reaction of a compound of the formula

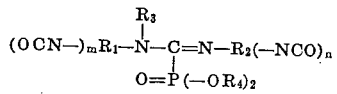

wherein $m$ is an integer having a value of from 1 to 3, $n$ is an integer having a value of from 1 to 3, $R_1$ and $R_2$ are radicals selected from the group consisting of (a) lower aliphatic radicals, (b) cyclo lower aliphatic radicals, (c) araliphatic radicals having from 6 to 20 carbon atoms, (d) aromatic radicals having from 6 to 20 carbon atoms, and (e) furfurylidene radicals, $R_3$ is selected from the group consisting of lower alkyl acyl radicals and

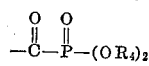

and $R_4$ is a radical selected from the group consisting of lower alkyl and chloro or bromo substituted lower alkyl groups with a compound containing at least two active hydrogen groups as determinable by the Zerewitinoff tests.

2. The composition of claim 1 wherein $m$ is an integer having a value of 2.

3. The composition of claim 1 wherein $n$ is an integer having a value of 2.

4. The composition of claim 1 wherein the compound has the formula

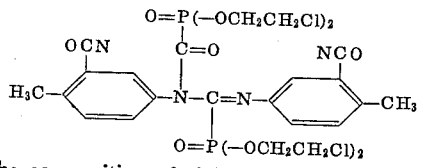

5. The composition of claim 1 wherein the compound has the formula

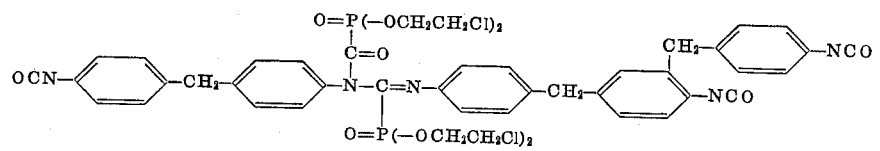

6. The composition of claim 1 wherein the compound has the formula

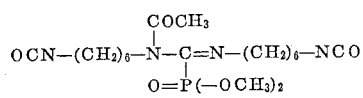

7. The composition of claim 1 wherein the compound containing at least two active hydrogen groups is selected from the class consisting of hydroxyl polyesters, polyhydric polyalkylene ethers, polyhydric polythioethers and polyacetals.

8. A method for preparing a flame resistant polyurethane plastic composition which comprises reacting a compound of the formula

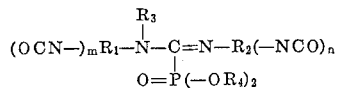

wherein $m$ is an integer having a value of from 1 to 3, $n$ is an integer having a value of from 1 to 3, $R_1$ and $R_2$ are radicals selected from the group consisting of (a) lower aliphatic radicals, (b) cyclo lower aliphatic radicals, (c) araliphatic radicals having from 6 to 20 carbon atoms, (d) aromatic radicals having from 6 to 20 carbon atoms, and (e) furfurylidene radicals, $R_3$ is selected from the group consisting of lower alkyl acyl radicals and

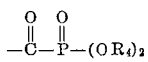

and $R_4$ is a radical selected from the group consisting of lower alkyl and chloro or bromo substituted lower alkyl groups with a compound containing at least two active hydrogen groups as determinable by the Zerewitinoff test.

9. The method of claim 8 wherein the compound has the formula

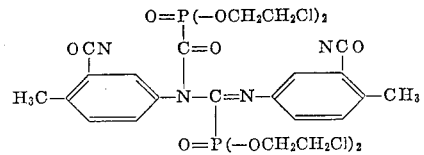

10. The method of claim 8 wherein the compound has the formula

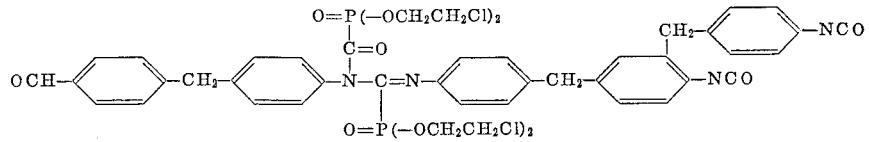

11. The method of claim 8 wherein the compound has the formula $$OCN-(CH_2)_6-\underset{\underset{O=P(OCH_3)_2}{|}}{\overset{\overset{COCH_3}{|}}{N}}-C=N-(CH_2)_6-NCO$$

12. The method of claim 8 wherein the compound containing at least two active hydrogen groups is selected from the class consisting of hydroxyl polyesters, polyhydric polyalkylenethers, polyhydric polythioethers and polyacetals.

No references cited.

DONALD E. CZAJA, *Primary Examiner.*

LEON J. BERCOVITZ, *Examiner.*